United States Patent
Yun

(10) Patent No.: US 11,373,282 B2
(45) Date of Patent: Jun. 28, 2022

(54) IMAGE PROCESSING APPARATUS AND METHOD

(71) Applicant: HYUNDAI MOBIS Co., Ltd., Seoul (KR)

(72) Inventor: Yeo Min Yun, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 53 days.

(21) Appl. No.: 16/807,455

(22) Filed: Mar. 3, 2020

(65) Prior Publication Data

US 2020/0294215 A1 Sep. 17, 2020

(30) Foreign Application Priority Data

Mar. 11, 2019 (KR) .................. 10-2019-0027565

(51) Int. Cl.
*G06T 5/50* (2006.01)
*B62D 15/02* (2006.01)
*G06T 7/00* (2017.01)

(52) U.S. Cl.
CPC .............. *G06T 5/50* (2013.01); *B62D 15/027* (2013.01); *G06T 7/0004* (2013.01); *G06T 2207/30264* (2013.01)

(58) Field of Classification Search
CPC ....... G06T 7/254; G06T 1/0007; G06T 11/00; G06T 15/50; G06T 2207/30252; G06T 3/00; G06T 2207/10016; G06T 2207/30232; G06T 3/0056; G06T 7/70; G06T 3/4038; G06T 5/50; G06T 7/0004; G06T 2207/30264; G06T 11/60; G06T 3/0062; G06T 5/006; G06T 7/62;
(Continued)

(56) References Cited

U.S. PATENT DOCUMENTS

| 9,834,143 B2* | 12/2017 | Zhang | G06T 3/0093 |
| 2002/0196340 A1* | 12/2002 | Kato | B60R 1/00 348/148 |

(Continued)

FOREIGN PATENT DOCUMENTS

| JP | 2014-041398 | 3/2014 |
| JP | 2014-154904 | 8/2014 |

(Continued)

OTHER PUBLICATIONS

Human Detection Based on the Generation of a Background Image by Using a Far-Infrared Light Camera (Year: 2015).*

(Continued)

*Primary Examiner* — Nizar N Sivji
(74) *Attorney, Agent, or Firm* — H.C. Park & Associates, PLC

(57) ABSTRACT

An image processing apparatus includes a conversion unit, a generation unit, and a processing unit. The conversion unit is configured to convert an original image received from a plurality of cameras into a top view image. The generation unit is configured to generate a surround view monitor (SVM) image by synthesizing a bottom image extracted from the top view image and a wall image extracted from the original image. The processing unit is configured to generate a modified SVM image by adjusting an area of the bottom image and an area of the wall image according to an adjustment condition, and to process the generated image into a display signal.

18 Claims, 7 Drawing Sheets

(58) Field of Classification Search
CPC .. G06T 3/0018; B62D 15/028; B62D 15/027; B62D 15/0285; B62D 15/0295; B62D 5/046; H04N 5/2257; H04N 5/23238; H04N 5/23296; H04N 7/188; H04N 5/265; H04N 7/181; H04N 5/217; B60W 40/09; B60W 2050/0095; B60W 50/14; B60W 40/02; B60W 2050/146; B60W 2554/00; B60W 2420/42
See application file for complete search history.

(56) References Cited

U.S. PATENT DOCUMENTS

| | | | | |
|---|---|---|---|---|
| 2004/0150589 | A1* | 8/2004 | Mizusawa | H04N 7/18 345/70 |
| 2008/0266137 | A1* | 10/2008 | Son | B62D 15/0275 340/932.2 |
| 2010/0245573 | A1* | 9/2010 | Gomi | H04N 7/181 348/148 |
| 2012/0002611 | A1 | 1/2012 | You et al. | |
| 2012/0327238 | A1* | 12/2012 | Satoh | G08G 1/167 348/148 |
| 2013/0120578 | A1* | 5/2013 | Iga | B62D 15/0295 348/148 |
| 2014/0055487 | A1* | 2/2014 | Kiyo | G06T 11/60 345/629 |
| 2015/0302561 | A1* | 10/2015 | Pekkucuksen | G06T 7/337 382/275 |
| 2016/0034768 | A1* | 2/2016 | Lee | G06T 7/13 348/38 |
| 2017/0132482 | A1* | 5/2017 | Kim | B60K 35/00 |
| 2017/0228605 | A1* | 8/2017 | Konishi | B60R 1/00 |
| 2017/0287168 | A1* | 10/2017 | Jeong | H04N 7/181 |
| 2018/0300899 | A1* | 10/2018 | Dreuw | G06T 7/80 |
| 2019/0080313 | A1* | 3/2019 | Van Wiemeersch | B62D 15/027 |
| 2019/0135342 | A1* | 5/2019 | Inoue | G08G 1/16 |
| 2019/0191106 | A1* | 6/2019 | Dabral | H04N 5/232 |
| 2020/0272831 | A1* | 8/2020 | Cho | G06K 9/00791 |

FOREIGN PATENT DOCUMENTS

| | | |
|---|---|---|
| KR | 10-2011-0126178 | 11/2011 |
| KR | 10-2017-0124232 | 11/2017 |
| KR | 20170124232 A * | 11/2017 |
| KR | 10-2018-0094717 | 8/2018 |

OTHER PUBLICATIONS

Review on Vehicle Detection Technology for Unmanned Ground Vehicles (Year: 2021).*

Vehicle Surround Capture: Survey of Techniques and a Novel Omni-Video-Based Approach for Dynamic Panoramic Surround Maps (Year: 2006).*

Zynq-based Full HD Around View Monitor System for Intelligent Vehicle (Year: 2017).*

* cited by examiner

FIG. 2A
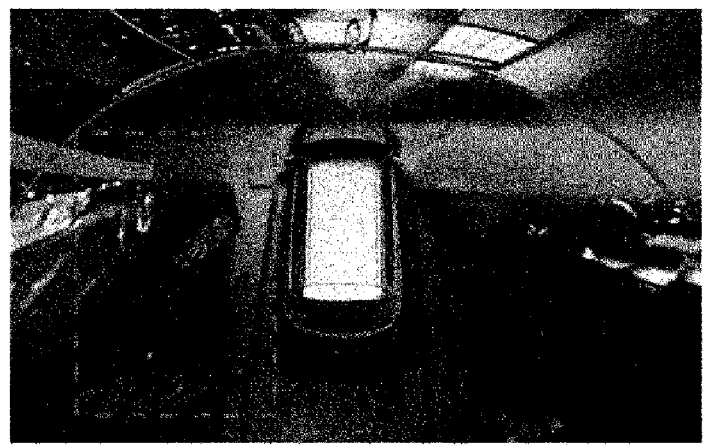
FIG. 2B  FIG. 2C
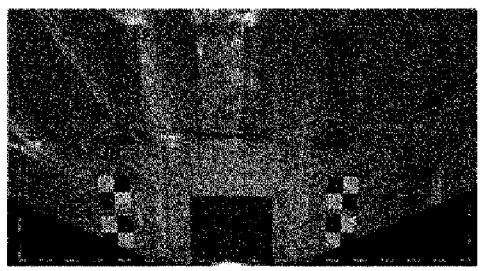 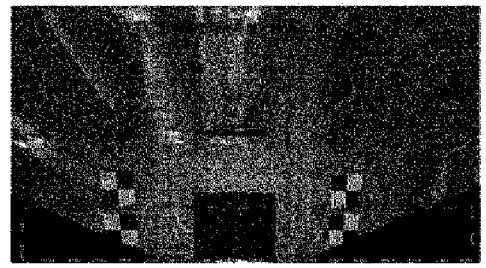
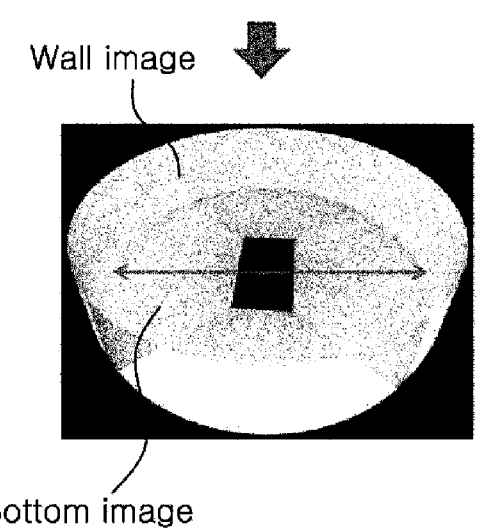 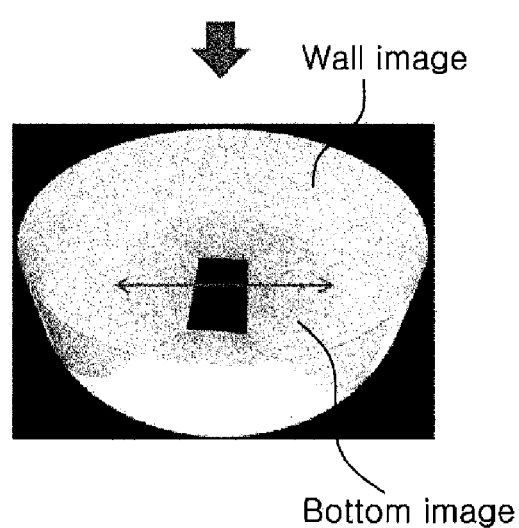
Wall image — Bottom image  Wall image — Bottom image

IMAGE PROCESSING APPARATUS AND METHOD

CROSS-REFERENCE TO RELATED APPLICATION

This application claims priority to and the benefit of Korean Patent Application No. 10-2019-0027565, filed Mar. 11, 2019, which is hereby incorporated by reference for all purposes as if fully set forth herein.

BACKGROUND

Field

Exemplary embodiments generally relate to an image processing apparatus and method.

Discussion

A three-dimensional (3D) surround view monitor (SVM) typically uses an image of an existing two-dimensional (2D) SVM for a bottom surface and synthesizes a wall image with the bottom image, thereby providing an intuitive and wide vision to a user, such as during driving. However, since the 3D SVM has step distortion like existing 2D SVM, distortion may occur when an object with a level difference from the bottom surface approaches.

A related disclosure includes Korean Patent Application No. 10-2011-0126178, laid-open on Nov. 22, 2011, and entitled "Method and Device for Uplink Cooperative Multipoint Transmission of User Data."

The above information disclosed in this section is only for understanding the background of the inventive concepts, and, therefore, may contain information that does not form prior art.

SUMMARY

Some aspects provide an image processing apparatus capable of varying the area of a bottom image in an SVM, and thus, minimize (or at least reduce) distortion of an image even though an object with a stepped portion approaches.

Some aspects provide a method for imaging processing capable of varying the area of a bottom image in an SVM, and thus, minimize (or at least reduce) distortion of an image even though an object with a stepped portion approaches.

Additional aspects will be set forth in the detailed description which follows, and, in part, will be apparent from the disclosure, or may be learned by practice of the inventive concepts.

According to some aspects, an image processing apparatus includes a conversion unit, a generation unit, and a processing unit. The conversion unit is configured to convert an original image received from a plurality of cameras into a top view image. The generation unit is configured to generate a surround view monitor (SVM) image by synthesizing a bottom image extracted from the top view image and a wall image extracted from the original image. The processing unit is configured to generate a modified SVM image by adjusting an area of the bottom image and an area of the wall image according to an adjustment condition, and to process the generated image into a display signal.

In an embodiment, the image processing apparatus may further include a distortion correction unit configured to correct distortion of the original image received from the plurality of cameras, and to output the corrected image to the conversion unit.

In an embodiment, the image processing apparatus may further include a first sensing unit configured to sense whether an object appears around a vehicle. The processing unit may be configured to generate a modified SVM image by widening the area of the bottom image and narrowing the area of the wall image according to a first adjustment condition in which the object appears, and to process the generated image into a display signal.

In an embodiment, the processing unit may be configured to generate a modified SVM image by adjusting a slope of the wall image according to an approaching distance of the object sensed by the first sensing unit, and to process the generated image into a display signal.

In an embodiment, the first sensing unit and the processing unit may be operated when the vehicle is being parked.

In an embodiment, the image processing apparatus may further include a second sensing unit configured to sense an operation of a steering wheel, and a third sensing unit configured to sense an operation of a direction indicator. The processing unit may be configured to generate a modified SVM image by widening the area of the bottom image for a forward area corresponding to an operation direction of the steering wheel or the direction indicator and narrowing the area of the wall image according to a second adjustment condition in which the steering wheel or the direction indicator is operated, and to process the generated image into a display signal.

In an embodiment, the second sensing unit, the third sensing unit, and the processing unit may be operated when the vehicle is traveling.

In an embodiment, the image processing apparatus may further include a first sensing unit configured to sense whether an object appears around the vehicle, a second sensing unit configured to sense an operation of a steering wheel, and a third sensing unit configured to sense an operation of a direction indicator. The processing unit may be further configured to generate a modified SVM image by widening the area of the bottom image for a forward area corresponding to an operation direction of the steering wheel or the direction indicator, narrowing the area of the wall image, and adjusting a slope of the wall image according to an approaching distance of the object sensed by the first sensing unit according to a third adjustment condition in which the object appears with the steering wheel or the direction indicator operated, and to process the generated image into a display signal.

In an embodiment, the first to third sensing units and the processing unit may be operated when the vehicle is being parked and/or when the vehicle is traveling.

According to some aspects, an image processing method includes: converting, by a conversion unit, an original image received from a plurality of cameras into a top view image; generating, by a generation unit, a surround view monitor (SVM) image by synthesizing a bottom image extracted from the top view image and a wall image extracted from the original image; generating, by a processing unit, a modified SVM image by adjusting the area of the bottom image and the area of the wall image according to an adjustment condition; and processing, by the processing unit, the generated image into a display signal.

In an embodiment, the image processing method may further include: correcting, by a distortion correction unit, distortion of the original image received from the plurality of cameras; and outputting, by the distortion correction unit, the corrected image to the conversion unit.

In an embodiment, the image processing method may further include: sensing, by a first sensing unit, whether an object appears around a vehicle. Generating the modified SVM image may include: generating a modified SVM image by widening the area of the bottom image and narrowing the area of the wall image according to a first adjustment condition in which the object appears; and processing the generated image into a display signal.

In an embodiment, generating the modified SVM image may further include: generating a modified SVM image by adjusting a slope of the wall image according to an approaching distance of the object sensed by the first sensing unit; and processing the generated image into a display signal.

In an embodiment, the first sensing unit and the processing unit may be operated when the vehicle is being parked.

In an embodiment, the image processing method may further include: sensing, by a second sensing unit, an operation of a steering wheel; and sensing, by a third sensing unit, an operation of a direction indicator. Generating the modified SVM image may include: generating a modified SVM image by widening the area of the bottom image for a forward area corresponding to the operation direction of the steering wheel or the direction indicator and narrowing the area of the wall image according to a second adjustment condition in which the steering wheel or the direction indicator is operated; and processing the generated image into a display signal.

In an embodiment, the second sensing unit, the third sensing unit, and the processing unit may be operated when the vehicle is traveling.

In an embodiment, the image processing method may further include: sensing, by a first sensing unit, whether an object appears around a vehicle; sensing, by a second sensing unit, an operation of a steering wheel; and sensing, by a third sensing unit, an operation of a direction indicator. Generating the modified SVM image may include: generating a modified SVM image by widening the area of the bottom image for a forward area corresponding to an operation direction of the steering wheel or the direction indicator, narrowing the area of the wall image, and adjusting a slope of the wall image according to an approaching distance of the object sensed by the first sensing unit according to a third adjustment condition in which the object appears with the steering wheel or the direction indicator operated; and processing the generated image into a display signal.

In an embodiment, the first to third sensing units and the processing unit may be operated when the vehicle is being parked and/or when the vehicle is traveling.

A method and system may also be provided for implementing at least one exemplary embodiment, as well as a computer program, e.g., one or more sequences of one or more instructions, for executing the method.

According to various exemplary embodiments, an image processing apparatus and method can vary the area of a bottom image in a 3D SVM, and thus, minimize (or at least reduce) distortion of an image even though an object approaches.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIGS. 2A, 2B, and 2C are diagrams schematically illustrating an image processing operation for correcting image distortion according to some exemplary embodiments.

DETAILED DESCRIPTION OF THE ILLUSTRATED EMBODIMENTS

Figure 1:
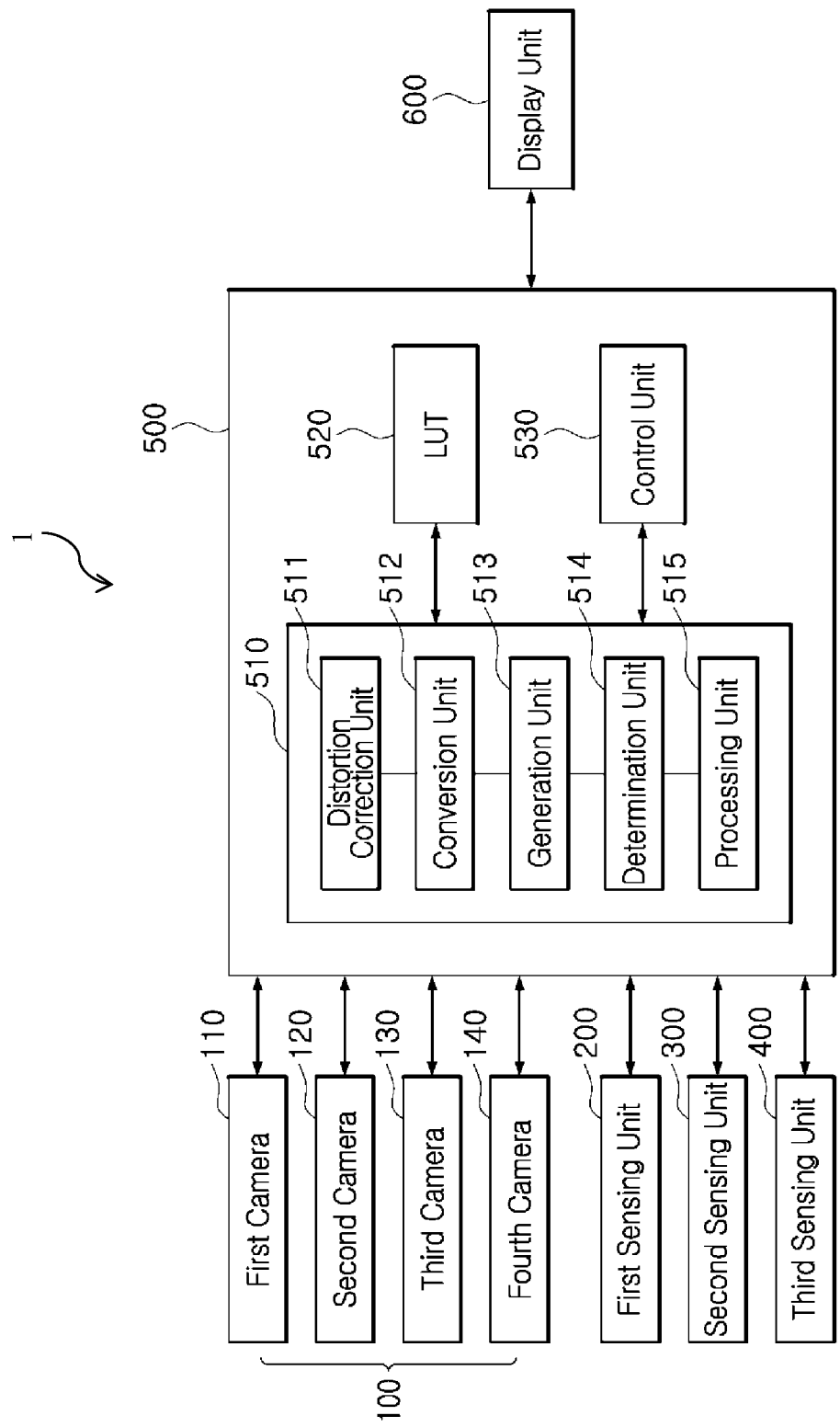
FIG. 1 is a diagram schematically illustrating an image processing apparatus according to some exemplary embodiments.

In the following description, for the purposes of explanation, numerous specific details are set forth in order to provide a thorough understanding of various exemplary embodiments. As used herein, the terms "embodiments" and "implementations" are used interchangeably and are non-limiting examples employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching, shading, and/or line thickness in the accompanying drawings is generally provided to clarify boundaries between adjacent elements. As such, neither the presence nor the absence of cross-hatching, shading, and/or line thicknesses indicates any preference or requirement for particular materials, material properties, dimensions, proportions, commonalities between illustrated elements, and/or any other characteristic, attribute, property, etc., of the elements, unless specified. Also, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments may be described herein with reference to sectional views, isometric views, perspective views, plan views, and/or exploded depictions that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Hereinafter, various exemplary embodiments will be described with reference to the accompanying drawings.

FIG. 1 is a diagram schematically illustrating an image processing apparatus according to some exemplary embodiments.

Referring to FIG. 1, an image processing apparatus 1 may include a camera 100, a first sensing unit 200, a second sensing unit 300, a third sensing unit 400, a processor 500, and a display unit 600.

The camera 100 may capture an image around a vehicle and transmit the captured image to the processor 500. The image that is captured by the camera 100 and transmitted to the processor 500 may be referred to as an original image. In some exemplary embodiments, the camera 100 may include first, second, third, and fourth cameras 110, 120, 130, and 140 that are disposed at, for instance, a front, rear, left, and right sides of the vehicle to capture images around the vehicle.

The camera 100 may capture an image of an object within a shooting area using, for instance, a complementary metal-oxide semiconductor (COMS) module, a charge coupled device (CDD) module, and/or the like. An input image frame or video may be provided to the CMOS module or the CCD module through a lens, and the CMOS module or the CCD module may convert an optical signal of the object that has passed through the lens into an electrical signal (or capture signal) and output the electrical signal.

In some exemplary embodiments, the camera 100 may include a wide angle camera. The wide angle camera refers to a camera that can capture an image at a wider field of view (FOV) than typical cameras. For example, the wide angle may have a wide angle lens or fisheye lens having a focal distance of 35 mm or less, such as 28 mm or less, in a 35 mm format. The wide angle camera may also include a camera that can capture an image at an FOV of 120 degrees or more, e.g., 150 degrees or more.

The camera 100 may further include an image processor. The image processor may reduce noise of an image frame and perform image signal processing for image quality enhancement, such as gamma correction, color filter array interpolation, color matrix, color correction, color enhancement, and/or the like. The image processor may functionally perform at least one of color processing, blur processing, edge emphasis processing, image analysis processing, image recognition processing, image effect processing, and the like. The image recognition processing may include, for example, at least one of face recognition, scene recognition, and the like. For instance, the image processor may perform at least one of luminance level adjustment, color correction, contrast adjustment, contour emphasis adjustment, screen split, character image generation, image synthesis, and the like. The image processor may be installed in (or associated with) the camera 100 or the processor 50, or may be installed as a separate device.

The first sensing unit 200 may sense an object approaching the vehicle or present around the vehicle, measure a distance to the object approaching the vehicle, and transmit the measured distance to the processor 500. The first sensing unit 200 may include at least one of an ultrasonic sensor, an infrared sensor, a light detection and ranging (LiDAR) sensor, a radar sensor, a laser sensor, and the like. In some exemplary embodiments, one first sensing unit 200 may be present at each side of the rear, but exemplary embodiments are not limited thereto. For instance, a plurality of sensing units may be installed to improve an ability of sensing an object.

The second sensing unit 300 may sense an operation of a steering wheel, and transmit the sensed operation to the processor 500. The steering wheel, which is a steering apparatus used for changing a traveling direction of the vehicle by moving the wheels of the vehicle in a side-to-side direction, may change the traveling direction to a leftward or rightward direction through the operation.

The third sensing unit 400 may sense an operation of a direction indicator, and output the sensed operation to the processor 500. The direction indicator may be operated by a driver to inform another vehicle of a turn, e.g., a left/right turn, of the vehicle.

In some exemplary embodiments, the sensing units may be limited to the first sensing unit 200, which senses an object approaching the vehicle or present around the vehicle and measures a distance to the object approaching the vehicle, the second sensing unit 300, which senses an operation of the steering wheel, and the third sensing unit 400, which senses an operation of the direction indicator. However, exemplary embodiments are not limited thereto. For example, at least one other sensing unit capable of, for instance, determining a situation around the vehicle or a state of the vehicle, or a component corresponding to the sensing unit may be further installed to output a sensing result to the processor 500.

Under control of a control unit 530, the processor 500 may generate an SVM image by processing an original image received from the camera 100, and determine an adjustment condition based on sensing signals received from the first to third sensing units 200 to 400. When the sensing signals satisfy the adjustment condition, the processor 500 may generate a modified SVM image and output the generated image to the display unit 600. In a selective embodiment, the processor 500 may be connected to a communication device that can perform vehicle to everything (V2X) communication to more delicately express a 3D SVM image. The processor 500 may process a 3D SVM image for, for instance, a construction site, a road situation, or a traffic situation such that the 3D SVM image can be displayed on the display unit 600 in real time through the V2X technology, and the 3D SVM image can be manipulated or seen by another device using the V2X technology.

In some exemplary embodiments, the processor 500 may include an image processing unit 510, a lookup table (LUT) 520, and the control unit 530. The image processing unit 510 may include a distortion correction unit 511, a conversion unit 512, a generation unit 513, a determination unit 514, and a processing unit 515.

The distortion correction unit 511 may correct distortion of the original image received from the camera 100 under control of the control unit 530. In some exemplary embodiments, the camera 100 may include a wide angle camera. Since an image captured by the wide angle camera may have a round shape in which distortion is present as a whole, the distortion correction unit 511 may correct distortion.

The conversion unit 512 may convert the image, whose distortion is corrected by the distortion correction unit 511 and which is output from the distortion correction unit 511, into a top view image under control of the control unit 530. The top view image may indicate an image from the visual point where a driver looks down from the top to the bottom of the vehicle, and the driver of the vehicle can see the vehicle and the area around the vehicle through the top view image. However, FIG. 2A illustrates an embodiment of the top view image showing that severe distortion occurs to such an extent that an object with a stepped portion (indicated by a dotted line) cannot be recognized when the object approaches the vehicle. Therefore, some exemplary embodiments provide a configuration capable of minimizing (or at least reducing) distortion of an image even though such an object with a stepped portion approaches.

Under control of the control unit 530, the generation unit 513 may extract a bottom image from the top view image converted by the conversion unit 512, extract a wall image from the original image captured by the camera 100, and then generate an SVM image by synthesizing the bottom image and the wall image. The generation unit 513 may use coordinate information stored in the LUT 520 when synthesizing the bottom image and the wall image. The LUT 520 is a table for storing information indicating from which coordinate of the original image the coordinate of each of pixel included in the top view image has come. When the bottom image and the wall image are synthesized, the generation unit 513 may generate a natural SVM image through a matching operation using the LUT 520. In some exemplary embodiments, installation of the LUT 520 may be an option. When the bottom image and the wall image are synthesized, coordinate information stored in the LUT 520 or coordinate information calculated in real-time may be used.

The determination unit 514 may determine an adjustment condition for generating the modified SVM image under control of the control unit 530. In some exemplary embodiments, the determination unit 514 may determine first to third adjustment conditions. The first adjustment condition may occur when an object appears around the vehicle and is sensed by the first sensing unit 200. For example, the first adjustment condition may occur when the vehicle is parked. The second adjustment condition may occur when an operation of the steering wheel is sensed by the second sensing unit 300 or an operation of the direction indicator is sensed by the third sensing unit 400. For example, the second adjustment condition may occur while the vehicle is traveling. The third adjustment condition may occur when an object appearing around the vehicle is sensed by the first sensing unit 200 with a steering wheel operation sensed by the second sensing unit 300 or a direction indicator operation sensed by the third sensing unit 400. The third adjustment condition may be an integrated condition including both of the first and second adjustment conditions.

Under control of the control unit 530, the processing unit 515 may generate a modified SVM image by adjusting the area of the bottom image and the area of the wall image according to the adjustment condition determined by the determination unit 514, and process the generated image into a display signal.

According to the first adjustment condition in which an object appears, the processing unit 515 may generate the modified SVM image by widening the area of the bottom image generated by the generation unit 513 and narrowing the area of the wall image, and process the generated image into a display signal. In some exemplary embodiments, an adjustment range for the area of the bottom image and the area of the wall image may be preset. Therefore, the processing unit 515 may adjust the area of the bottom image and the area of the wall image according to the preset adjustment range. FIG. 2B illustrates a bottom image and a wall image before an object appears, and FIG. 2C illustrates the bottom image and the wall image after the object appears. FIG. 2C shows that the area of the bottom image is further increased and the area of the wall image is further decreased than in FIG. 2B. As described above, the bottom image may be extracted from the top view image, the wall image may be extracted from the original image, and the bottom image and the wall image may be matched with each other by the LUT 520 and synthesized into a natural SVM image, which makes it possible to minimize distortion of the SVM image.

In some exemplary embodiments, the first adjustment condition may further include an approaching distance of the object sensed by the first sensing unit 200. Therefore, the processing unit 515 may generate a modified SVM image by adjusting the slope of the wall image according to the approaching distance of the object, and process the generated image into a display signal. The slope of the wall image may be preset according to the approaching distance of the object. For example, under a condition that a reference distance from the object to the vehicle is set to 10 m, for example, the processing unit 515 may increase the slope of the wall image by five degrees whenever the object approaches the vehicle by 1 m, and decrease the slope of the wall image by five degrees whenever the object moves away from the vehicle by 1 m. When the object moves away from the vehicle by 10 m or more, the processing unit 515 may change the area and slope of the wall image to the initial state.

Figure 3:
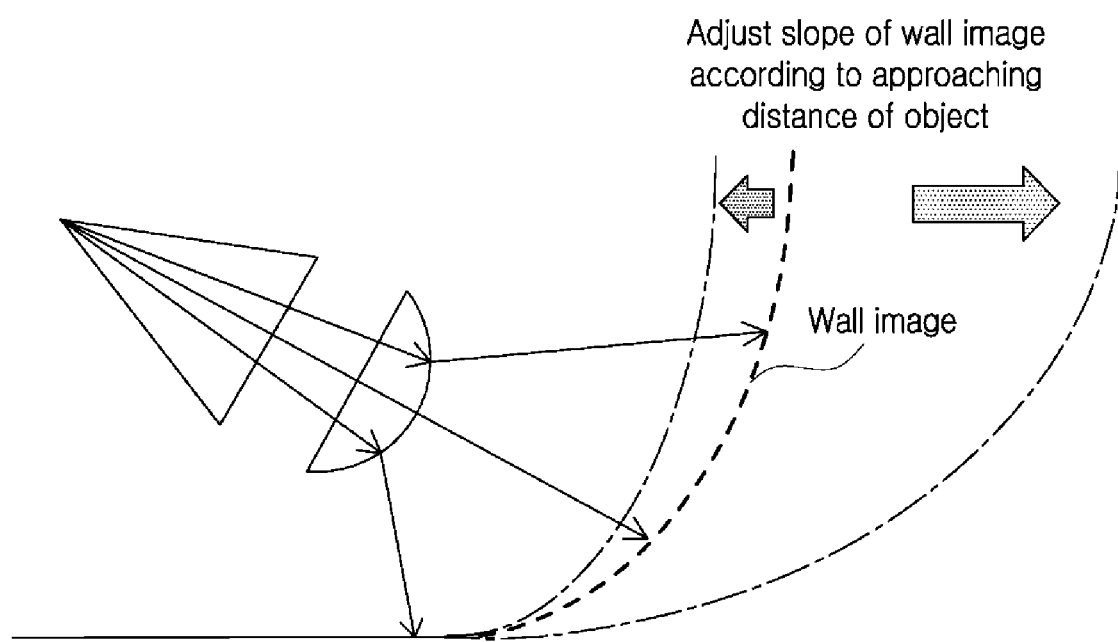
FIG. 3 is a diagram schematically illustrating an image processing operation for creating a three-dimensional effect according to some exemplary embodiments.

According to the second adjustment condition in which the steering wheel or the direction indicator is operated, the processing unit 515 may generate a modified SVM image by widening the area of the bottom image for a forward area corresponding to the operation direction of the steering wheel or the direction indicator and narrowing the area of the wall image, and process the generated image into a display signal. The processing unit 515 may generate the modified SVM image by widening the area of a right or left bottom image for the forward area corresponding to the right or left direction of the steering wheel or the direction indicator and narrowing the area of a right or left wall image, and process the generated image into a display signal. When the second adjustment condition is released, e.g., when the steering wheel is operated toward the front or the operation of the direction indicator is stopped, the processing unit 515 may change the area of the bottom image and the area of the wall image to the initial state. FIG. 3 illustrates that the slope of the wall image is adjusted according to the approaching distance of the object. The processing unit 515 may increase the slope of the wall image as the object approaches the vehicle, and decrease the slope of the wall image as the object moves away from the vehicle, thereby providing a 3D image.

According to the third adjustment condition in which the object appears with the steering wheel or the direction indicator operated, the processing unit 515 may generate a modified SVM image by widening the area of the bottom image for the forward area corresponding to the operation direction of the steering wheel or the direction indicator, narrowing the area of the wall image, and adjusting the slope of the wall image according to the approaching distance of the object sensed by the first sensing unit 200.

Figure 4:
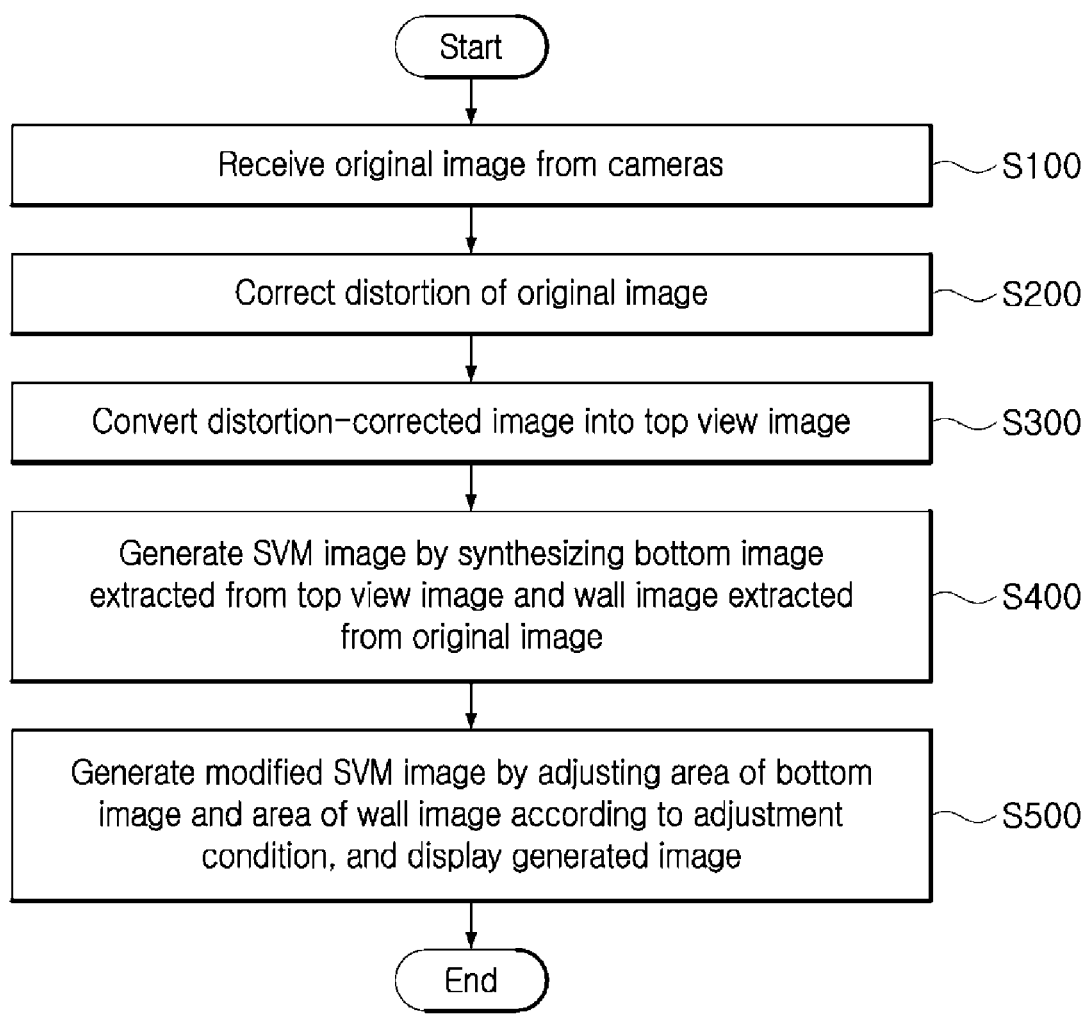
FIGS. 4, 5, 6, and 7 are flowcharts illustrating an image processing method according to some exemplary embodiments.

FIG. 4 is a flowchart illustrating an image processing method according to some exemplary embodiments. Hereinafter, the description of contents overlapping the descriptions of FIGS. 1 to 3 will be omitted.

Referring to FIG. 4, the processor 500 receives an original image from the plurality of cameras 100, e.g., the first to fourth cameras 110 to 140, the original image being obtained by capturing an image around the vehicle, in step S100. The camera 100 may include a wide angle camera.

In step S200, the processor 500 corrects distortion of the original image received from the camera 100. Since an image captured by the wide angle camera may have a round shape in which distortion is present as a whole, the distortion correction unit 511 may correct the distortion.

In step S300, the processor 500 converts the distortion-corrected image into a top view image.

In step S400, the processor 500 extracts a bottom image from the top view image, extracts a wall image from the original image captured by the camera 100, and then generates an SVM image by synthesizing the bottom image and the wall image. The processor 500 may use coordinate information stored in the LUT 520 when synthesizing the bottom image and the wall image. The LUT 520 is a table for storing information indicating from which coordinate of the original image the coordinate of each of the pixels included in the top view image have come. When the bottom image and the wall image are synthesized, the processor 500 may generate a natural SVM image through a matching operation using the LUT 520.

In step S500, the processor 500 may generate a modified SVM image by adjusting the area of the bottom image and the area of the wall image according to the adjustment condition, process the generated image into a display signal, and output the display signal to the display unit 600. Thus, a driver can see the SVM image whose distortion is minimized.

Figure 5:
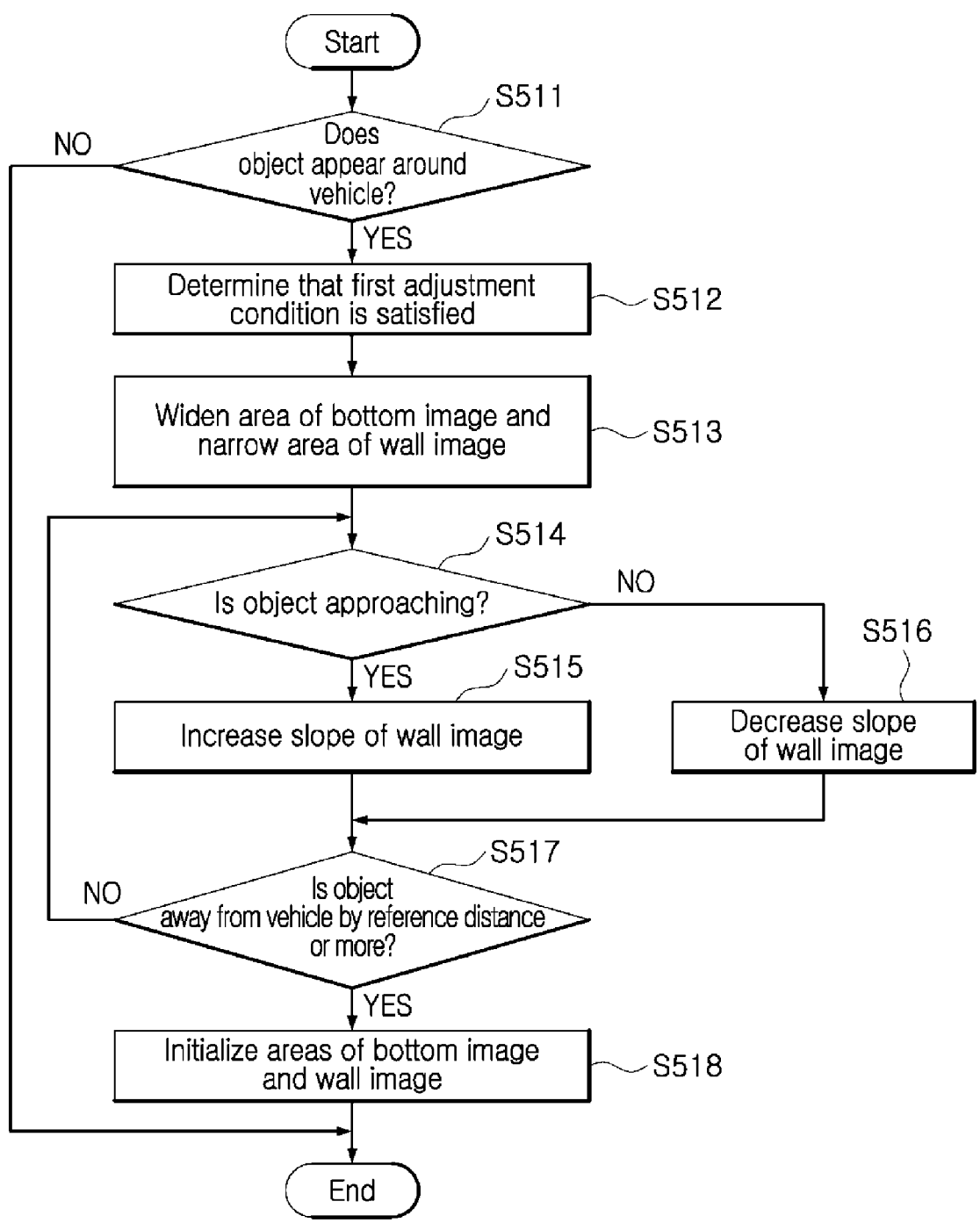

FIG. 5 is a flowchart illustrating a method for generating a modified SVM image according to some exemplary embodiments. Hereinafter, the descriptions of contents overlapping the descriptions of FIGS. 1 to 4 will be omitted. The method for generating a modified SVM image in FIG. 5 may be enabled and performed when a vehicle is parked.

Referring to FIG. 5, the processor 500 determines whether an object appears around the vehicle, in step S511. The processor 500 may determine whether an object appears, according to a sensing signal received from the first sensing unit 200.

In step S512, the processor 500 determines that the first adjustment condition is satisfied when the object appears around the vehicle.

In step S513, according to the first adjustment condition in which the object appears, the processor 500 generates a modified SVM image by widening the area of the bottom image and narrowing the area of the wall image, processes the generated image into a display signal, and then outputs the display signal to the display unit 600.

In step S514, the processor 500 determines whether the object is approaching based on the signal from the first sensing unit 200.

In step S515, when the object is approaching, the processor 500 generates a modified SVM image by increasing the slope of the wall image, processes the generated image into a display signal, and then outputs the display signal to the display unit 600.

In step S516, when the object is moving away from the vehicle, the processor 500 generates a modified SVM image by decreasing the slope of the wall image, processes the generated image into a display signal, and then outputs the display signal to the display unit 600.

In step S517, the processor 500 determines whether the object is away from the vehicle by a reference distance or more.

In step S518, when the object is away from the vehicle by the reference distance or more, the processor 500 determines to release the first adjustment condition, and changes the area of the bottom image, the area of the wall image, and the slope to the initial state.

Figure 6:
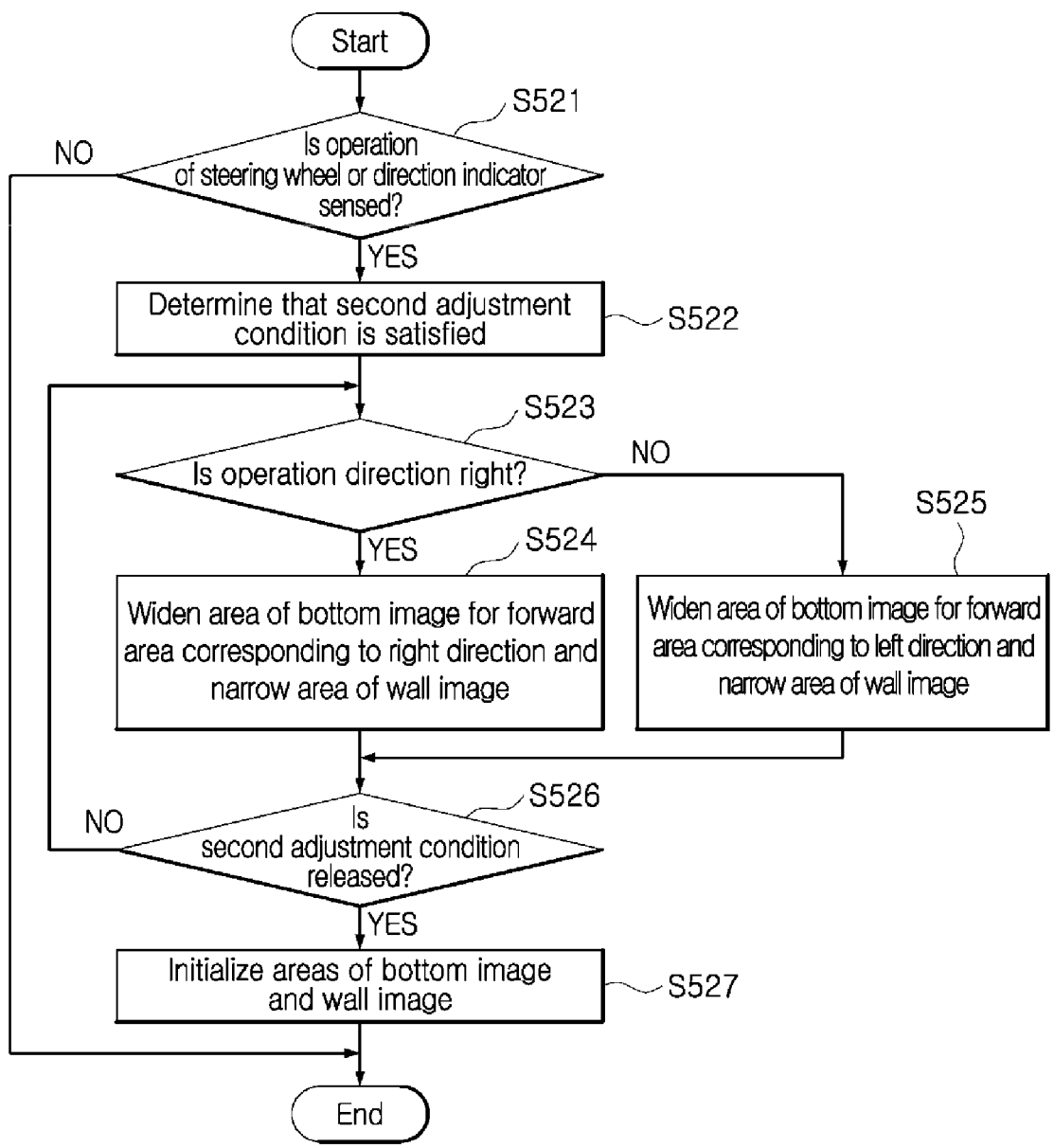

FIG. 6 is a flowchart illustrating a method for generating a modified SVM image according to some exemplary embodiments in FIG. 4. Hereinafter, the descriptions of contents overlapping the descriptions of FIGS. 1 to 5 will be omitted. The method for generating a modified SVM image in FIG. 6 may be enabled and performed when the vehicle is traveling.

Referring to FIG. 6, the processor 500 determines whether an operation of the steering wheel or the direction indicator is sensed, in step S521. The processor 500 may sense the operation of the steering wheel or the direction indicator according to a sensing signal received from the second or third sensing unit 300 or 400.

In step S522, the processor 500 determines that the second adjustment condition is satisfied when the operation of the steering wheel or the direction indicator is sensed.

In step S523, the processor 500 determines whether the operation direction of the steering wheel or the direction indicator is right.

In step S524, when the operation direction of the steering wheel or the direction indicator is right, the processor 500 generates a modified SVM image by widening the area of a right bottom image for a forward area corresponding to the right direction of the steering wheel or the direction indicator and narrowing the area of a right wall image, processes the generated image into a display signal, and then outputs the display signal to the display unit 600.

In step S525, when the operation direction of the steering wheel or the direction indicator is left, the processor 500 generates a modified SVM image by widening the area of a left bottom image for a forward area corresponding to the left direction of the steering wheel or the direction indicator and narrowing the area of a left wall image, processes the generated image into a display signal, and then outputs the display signal to the display unit 600.

In step S526, the processor 500 determines whether the second adjustment condition was released. When the steering wheel is operated toward the front or the operation of the direction indicator is stopped, the processor 500 determines that the second adjustment condition was released.

In step S527, when the second adjustment condition is released, the processor 500 changes the area of the bottom image and the area of the wall image to the initial state.

Figure 7:
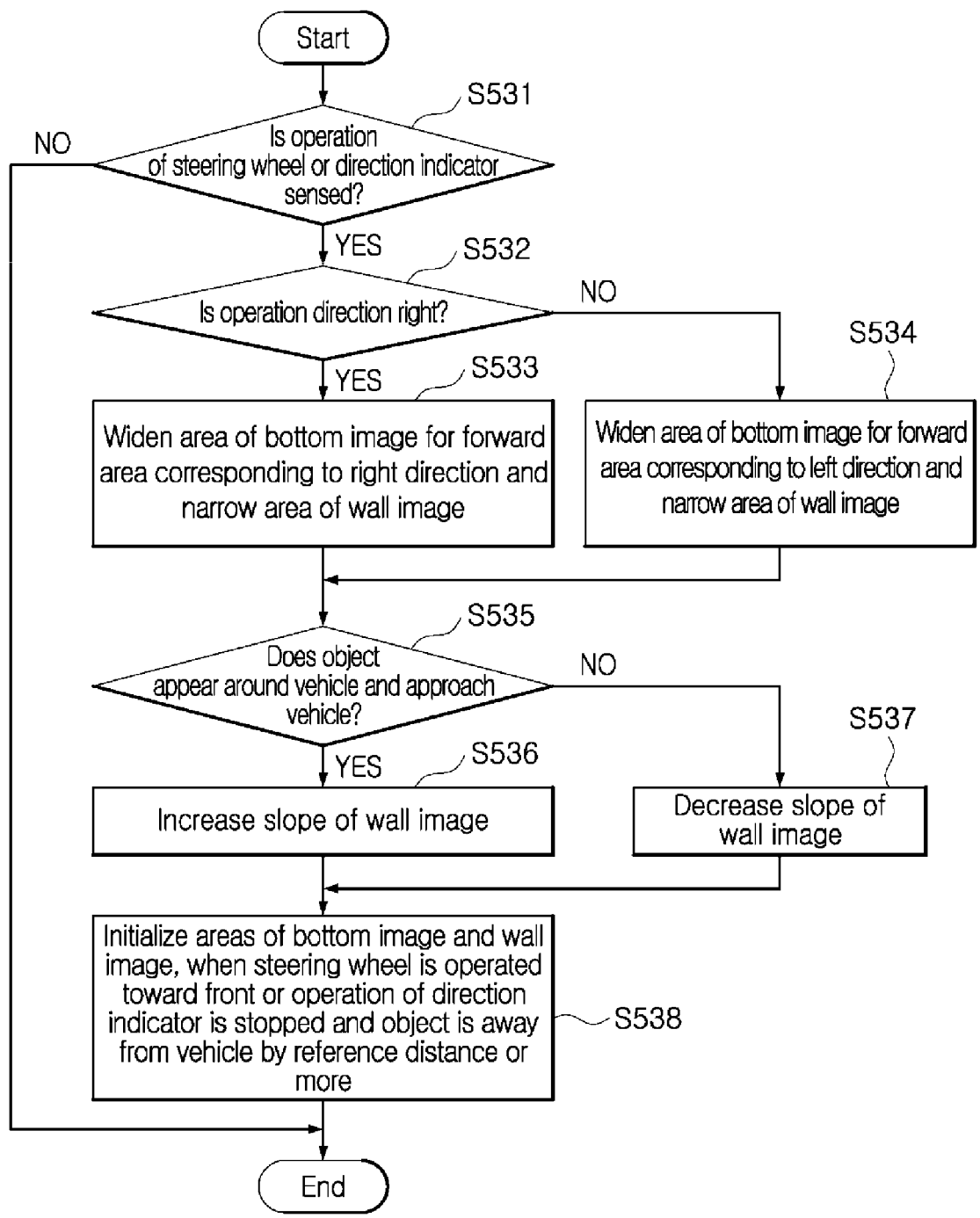

FIG. 7 is a flowchart illustrating a method for generating a modified SVM image according to some exemplary embodiments in FIG. 4. Hereinafter, the descriptions of contents overlapping the descriptions of FIGS. 1 to 6 will be omitted. The method for generating a modified SVM image in FIG. 7 may be implemented as an integrated method that can be applied when the vehicle is parked and driven.

Referring to FIG. 7, the processor 500 determines whether an operation of the steering wheel or the direction indicator is sensed, in step S531. The processor 500 may sense the operation of the steering wheel or the direction indicator according to a sensing signal received from the second or third sensing unit 300 or 400.

In step S532, the processor 500 determines whether the operation direction of the steering wheel or the direction indicator is right.

In step S533, when the operation direction of the steering wheel or the direction indicator is right, the processor 500 generates a modified SVM image by widening the area of a right bottom image for a forward area corresponding to the right direction of the steering wheel or the direction indicator and narrowing the area of a right wall image, processes the generated image into a display signal, and then outputs the display signal to the display unit 600.

In step S534, when the operation direction of the steering wheel or the direction indicator is left, the processor 500 generates a modified SVM image by widening the area of a left bottom image for a forward area corresponding to the left direction of the steering wheel or the direction indicator and narrowing the area of a left wall image, processes the generated image into a display signal, and then outputs the display signal to the display unit 600.

In step S535, the processor 500 determines whether an object appears around the vehicle and approaches the vehicle. The processor 500 determines whether the object appears and approaches the vehicle based on a sensing signal received from the first sensing unit 200.

In step S536, when the object is approaching, the processor 500 generates a modified SVM image by increasing the slope of the wall image, processes the generated image into a display signal, and then outputs the display signal to the display unit 600.

In step S537, when the object is moving away from the vehicle, the processor 500 generates a modified SVM image by decreasing the slope of the wall image, processes the generated image into a display signal, and then outputs the display signal to the display unit 600.

In step S538, when the steering wheel is operated toward the front or the operation of the direction indicator is stopped and the object is away from the vehicle by the reference distance or more, the processor 500 determines to release the third adjustment condition, and changes the area of the bottom image, the area of the wall image, and the slope to the initial state.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. An image processing apparatus comprising:
   a conversion unit configured to convert an original image received from a plurality of cameras into a top view image;
   a generation unit configured to generate a surround view monitor (SVM) image by synthesizing a bottom image extracted from the top view image and a wall image extracted from the original image captured by the plurality of cameras, wherein the wall image is a physical barrier with a stepped portion; and
   a processing unit configured to:
      generate a modified SVM image by adjusting an area of the bottom image and an area of the wall image according to an adjustment condition; and
      process the generated image into a display signal.

2. The image processing apparatus of claim 1, further comprising:
   a distortion correction unit configured to:
      correct distortion of the original image received from the plurality of cameras; and
      output the corrected image to the conversion unit.

3. The image processing apparatus of claim 1, further comprising:
   a first sensing unit configured to sense whether an object appears around a vehicle,
   wherein the processing unit is configured to:
      generate a modified SVM image by widening the area of the bottom image and narrowing the area of the wall image according to a first adjustment condition in which the object appears; and
      process the generated image into a display signal.

4. The image processing apparatus of claim 3, wherein the processing unit is configured to:
   generate a modified SVM image by adjusting a slope of the wall image according to an approaching distance of the object sensed by the first sensing unit; and
   process the generated image into a display signal.

5. The image processing apparatus of claim 3, wherein the first sensing unit and the processing unit are operated when the vehicle is being parked.

6. The image processing apparatus of claim 1, further comprising:
   a second sensing unit configured to sense an operation of a steering wheel; and
   a third sensing unit configured to sense an operation of a direction indicator,
   wherein the processing unit is configured to:
      generate a modified SVM image by widening the area of the bottom image for a forward area corresponding to an operation direction of the steering wheel or the direction indicator and narrowing the area of the wall image according to a second adjustment condition in which the steering wheel or the direction indicator is operated; and
      process the generated image into a display signal.

7. The image processing apparatus of claim 6, wherein the second sensing unit, the third sensing unit, and the processing unit are operated when the vehicle is traveling.

8. The image processing apparatus of claim 1, further comprising:
   a first sensing unit configured to sense whether an object appears around the vehicle;
   a second sensing unit configured to sense an operation of a steering wheel; and
   a third sensing unit configured to sense an operation of a direction indicator,
   wherein the processing unit is configured to:
      generate a modified SVM image by widening the area of the bottom image for a forward area corresponding to an operation direction of the steering wheel or the direction indicator, narrowing the area of the wall image, and adjusting a slope of the wall image according to an approaching distance of the object sensed by the first sensing unit according to a third adjustment condition in which the object appears with the steering wheel or the direction indicator operated; and
      process the generated image into a display signal.

9. The image processing apparatus of claim 8, wherein the first to third sensing units and the processing unit are operated when the vehicle is being parked and/or when the vehicle is traveling.

10. An image processing method comprising:
    converting, by a conversion unit, an original image received from a plurality of cameras into a top view image;
    generating, by a generation unit, a surround view monitor (SVM) image by synthesizing a bottom image extracted from the top view image and a wall image extracted from the original image captured by the plurality of cameras, wherein the wall image is a physical barrier with a stepped portion;
    generating, by a processing unit, a modified SVM image by adjusting an area of the bottom image and an area of the wall image according to an adjustment condition; and
    processing, by the processing unit, the generated image into a display signal.

11. The image processing method of claim 10, further comprising:
    correcting, by a distortion correction unit, distortion of the original image received from the plurality of cameras; and
    outputting, by the distortion correction unit, the corrected image to the conversion unit.

12. The image processing method of claim 10, further comprising:
    sensing, by a first sensing unit, whether an object appears around a vehicle,
    wherein generating the modified SVM image comprises:
       generating a modified SVM image by widening the area of the bottom image and narrowing the area of the wall image according to a first adjustment condition in which the object appears; and
       processing the generated image into a display signal.

13. The image processing method of claim 12, wherein generating the modified SVM image further comprises:
    generating a modified SVM image by adjusting a slope of the wall image according to an approaching distance of the object sensed by the first sensing unit; and
    processing the generated image into a display signal.

14. The image processing method of claim 12, wherein the first sensing unit and the processing unit are operated when the vehicle is being parked.

15. The image processing method of claim 10, further comprising:
   sensing, by a second sensing unit, an operation of a steering wheel; and
   sensing, by a third sensing unit, an operation of a direction indicator,
   wherein generating the modified SVM image comprises:
      generating a modified SVM image by widening the area of the bottom image for a forward area corresponding to the operation direction of the steering wheel or the direction indicator and narrowing the area of the wall image according to a second adjustment condition in which the steering wheel or the direction indicator is operated; and
      processing the generated image into a display signal.

16. The image processing method of claim 15, wherein the second sensing unit, the third sensing unit, and the processing unit are operated when the vehicle is traveling.

17. The image processing method of claim 10, further comprising:
   sensing, by a first sensing unit, whether an object appears around a vehicle;
   sensing, by a second sensing unit, an operation of a steering wheel; and
   sensing, by a third sensing unit, an operation of a direction indicator,
   wherein generating the modified SVM image comprises:
      generating a modified SVM image by widening the area of the bottom image for a forward area corresponding to an operation direction of the steering wheel or the direction indicator, narrowing the area of the wall image, and adjusting a slope of the wall image according to an approaching distance of the object sensed by the first sensing unit according to a third adjustment condition in which the object appears with the steering wheel or the direction indicator operated; and
      processing the generated image into a display signal.

18. The image processing method of claim 17, wherein the first to third sensing units and the processing unit are operated when the vehicle is being parked and/or when the vehicle is traveling.

* * * * *